April 1, 1941.　　　D. G. JENSEN　　　2,237,054
HEATING EQUIPMENT
Filed Nov. 13, 1937　　　2 Sheets-Sheet 1

INVENTOR
Donald G. Jensen
BY Maréchal & Noe
ATTORNEYS

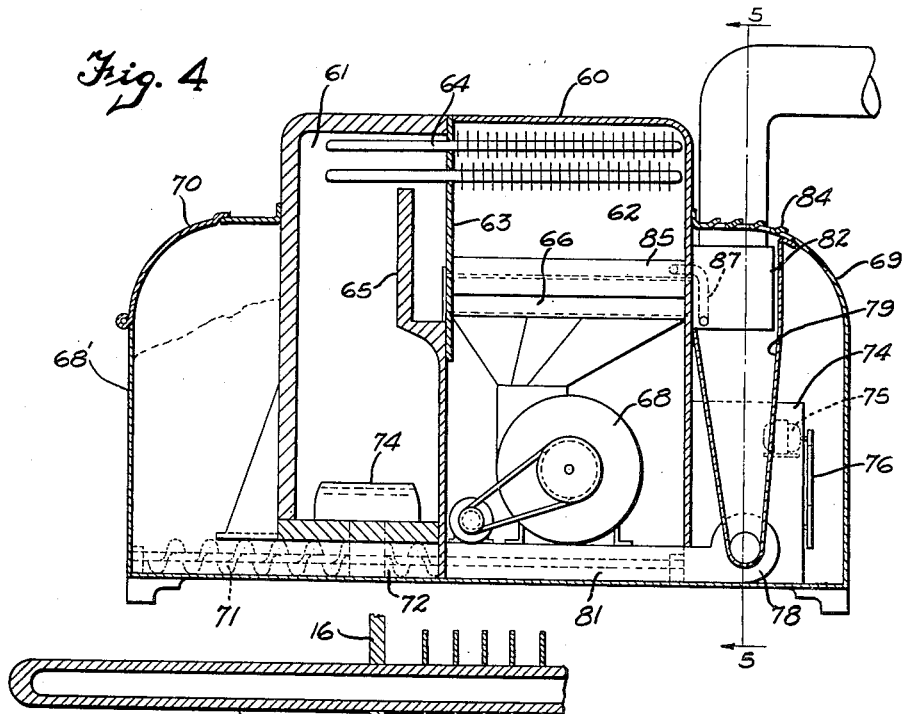
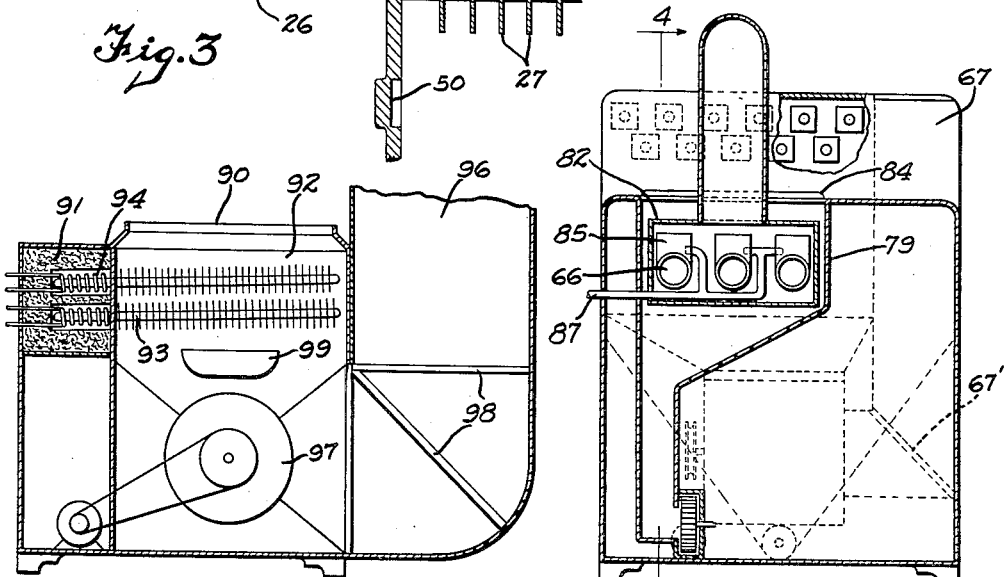

Patented Apr. 1, 1941

2,237,054

UNITED STATES PATENT OFFICE 2,237,054

HEATING EQUIPMENT

Donald G. Jensen, Cincinnati, Ohio

Application November 13, 1937, Serial No. 174,401

5 Claims. (Cl. 126—101)

This invention relates to heating equipment, and more particularly to space heating furnaces.

It is the principal object of this invention to provide a highly efficient and economical heating device in which heat from a heat source is effectively transferred to a circulating medium.

It is a further object to provide a heating device which is arranged to receive heat at high temperature from a source thereof such as a burning body of fuel, and to transmit and radiate such heat into a body of air or the like to be heated with high overall efficiency at both high and low combustion rates.

Still another object is to provide an economical heating device in which heat from a heat source is transferred with high efficiency to a circulating medium by the use of sealed tubes containing a heat transferring material, and which is of simple construction, compact arrangement, and can be easily and economically maintained in efficient operating condition.

It is its further object to provide a heating device of high efficiency and high heat capacity which is adapted to be used for a wide range of capacities and which is of such compact size that it may be assembled, shipped and installed in unit form and with a minimum of expense.

Other objects and advantages will be apparent from the accompanying drawings, the following description and the appended claims.

In the drawings,

Fig. 3 is a fragmental longitudinal section showing one of the steam tubes and associated parts;

Fig. 4 is a longitudinal sectional view taken on the line 4—4 of Fig. 5, and showing a modification;

Fig. 5 is a vertical transverse section taken on the line 5—5 of Fig. 4; and

Fig. 6 is a longitudinal vertical sectional view showing a further modification.

Figure 1:
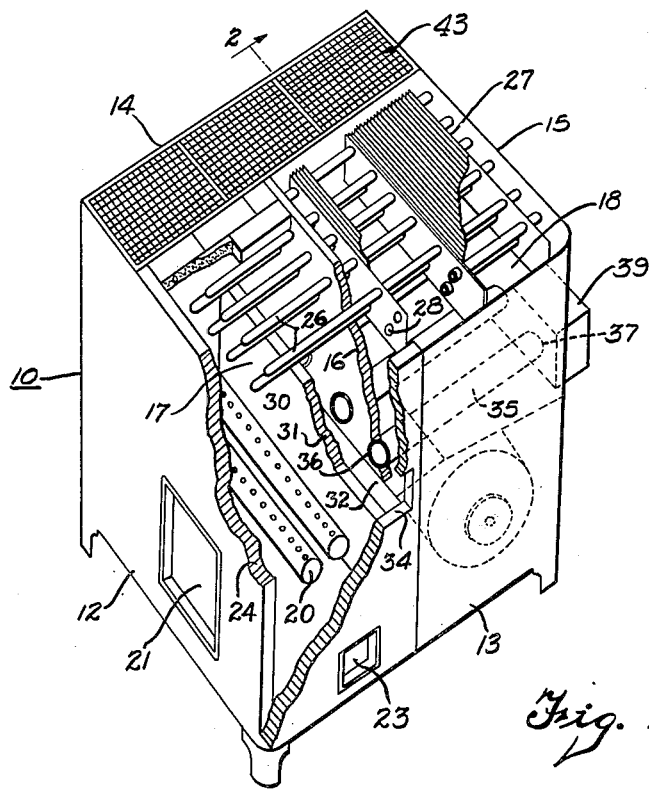
Fig. 1 is a view in the nature of a perspective, with certain of the parts broken away, and showing a heating device embodying the present invention.
Figure 2:
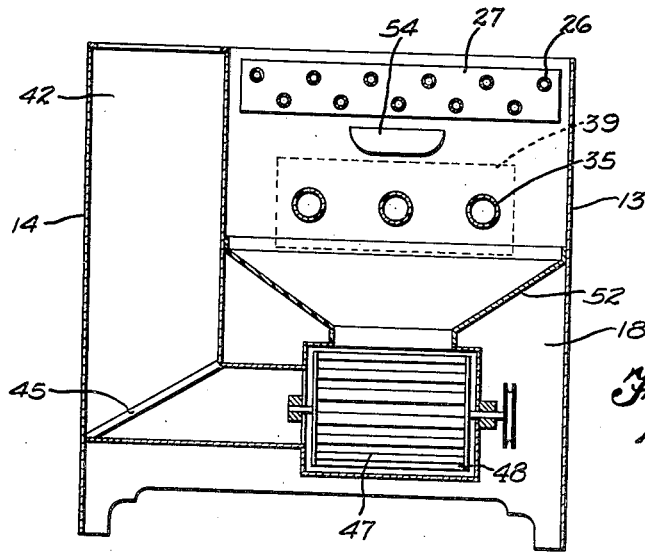
Fig. 2 is a vertical sectional view taken on the line 2—2 of Fig. 1.

Referring to the drawings which disclose preferred embodiments of the invention, there is shown in Figs. 1 and 2 a furnace having a casing indicated generally by the numeral 10, and having a front wall 12, side walls 13 and 14, and rear wall 15. Casing 10 is divided by transverse wall 16 into two main compartments, these being the primary heating compartment 17, located in the forward portion of the casing 10, and secondary heating compartment 18, located in the rearward portion of casing 10.

The source of heat of the furnace may be either solid fuel such as coal, liquid or gaseous fuel, or any desired source which provides available heat at relatively high temperatures such as those resulting from the ordinary processes of combustion. Combustion of whatever fuel is selected takes place in primary heating chamber 17 which contains a suitable heat source 20, shown as a burner for gas, and opening 21 is provided in front wall 12 for access to or attachment of the heat source and its associated operating connections. Other apertures for inspection, cleaning, and the like may be provided, such as aperture 23 located in side wall 13. The exterior walls of primary heating chamber 17 and preferably of the entire device are formed of heat insulating material of such thickness, as indicated at 24, as to effectively prevent undesired loss of heat therefrom.

The heated gases, flames and products of combustion from the heat source in chamber 17 are directed upwardly against and into heat transmitting relation with the ends of a series of tubes, indicated by numeral 26. These tubes 26 are supported in the upper part of casing 10, and extend longitudinally of the furnace through transverse wall 16 and into secondary heating chamber 18.

Each tube 26, is of sealed construction, and is formed with heavy metal side walls, and has sealed within it a predetermined quantity of liquid. In the illustrated construction, the tubes 26 are formed from wrought iron of high degree of purity and possessed of high tensile strength. As an example of tube dimensions which has given satisfactory performance, an outside diameter of 1⅜ inches, and an inside diameter of ½ inch has been used with a tube having an overall length of the order of 40 inches. Such tubes are sealed to provide an integral and impervious casing and contain a predetermined quantity of liquid, such as lime-free and preferably distilled water the amount varying with the vaporization characteristics of the liquid and in the case of a medium consisting of water preferably ranging from about 33% to 42% of the tube capacity. Such a tube is capable of withstanding high pressures of the order of 800 atmospheres or more, and will safely withstand the pressures developed in use. A quantity of water substantially less than that given, however, tends to decrease the efficiency of the heat transferring performance of the tubes, and a quantity substantially in excess of that set out may create a danger of bursting the tubes, due to the excessive pressure developed upon the application of high heat. While other vaporizable liquids having suitable characteristics may be utilized as the heat transferring medium, the preferred material for this purpose is water as described, and for this reason the tubes are referred to as steam tubes.

In the operation of such tubes, one end thereof is arranged to pick up or receive heat from the source, being located in a high temperature zone, such as directly in the flames or in the direct path of the products of combustion. The temperature of the tube end is raised to a high value, with resultant vaporization of the liquid within the tube and the building up of a high vapor pressure. Convection currents within the tube coupled with conduction, provide for effective transfer of heat from the one end of the tube toward the other where it is released by radiation. The transfer of heat under the high pressure vapor conditions is thus extraordinarily effective, and results in a very high degree of efficiency as compared with conventional heating devices. It should be noted that steam tubes 26 are preferably somewhat inclined forwardly in order to facilitate the circulation of the heat transferring medium and to provide a gravity return of condensed water to the heating zone at the forward ends.

Radiating means are provided within secondary chamber 18, and associated with the portions of steam tubes 26 located in that chamber. These radiating means preferably take the form of fin members 27, and as illustrated these fin members comprise a plurality of transverse substantially vertically positioned thin metal plates. Each of these plates is formed with a series of apertures 28 which receive tubes 26 in closely fitting heat transferring relationship. In the illustrated construction, the tubes 26 are arranged in layers, and with the tubes of the separate layers staggered, as best shown in Fig. 2, and apertures 28 are correspondingly arranged. Fin members 27 extend substantially the full width of the upper end of secondary compartment 18, and are arranged in substantially vertical position and closely spaced along tubes 26. These fins 27 provide a network of passageways through which the circulating air passes, and as fins 27 are efficiently heated to a high temperature by contact and close juxtaposition with tubes 26, they form a highly effective means of transferring heat to the circulating air.

In order to direct the hot products of combustion from the heat source along the desired path, baffle member 30 is built into primary chamber 17. Baffle 30 extends transversely across chamber 17 and is located forwardly of transverse wall 16, and comprises a vertical wall portion 31 which extends from a point intermediate the top and bottom of casing 10 upwardly to a point underlying the lowermost of the tubes 26. The lower end of wall 31 is joined to transverse wall 16 by a horizontally extending connecting wall 32. Baffle member 30 thus forms a trough-like portion between itself and transverse wall 16, and the hot products of combustion are directed in a plurality of passes over the tubes to provide for effective heat pick up, and after leaving the ends of the tubes 26 pass downwardly through this trough-like portion. Clean-out opening 34 in side wall 13 provides access to the trough-like portion for cleaning purposes, inspection, and the like.

The hot products of combustion escape from the lower portion of this trough-like area by means of flue members 35 which extend generally horizontally to rear wall 15 of the casing. The forward ends of horizontal flue members 35 connect with suitable apertures 36 formed in transverse wall 16 and opening into the trough-like inclosure between wall 16 and baffle member 30, and the rearward ends of flue members 35 connect to openings 37 in rear wall 15. Openings 37 open into a flue header 39, and from here the hot products of combustion are directed to the stack. It will thus be seen that flue members 35 pass through secondary heating chamber 18, and the flue members 35 are constructed with walls of suitable heat conducting construction, such as sheet metal providing for heat radiation therefrom to effect recovery of the heat remaining in the flue gases. In actual operation it has been found practicable to secure as great a recovery of the generated heat as desired, leaving in the flue gas at the time of its passage to the stack only sufficient heat to create the necessary natural draft where that is relied upon.

Secondary heating chamber 18 is constructed to bring a circulating medium into contact with flue members 35, heated by the passage therethrough of the products of combustion, and also into contact with tubes 26, heated by the application of heat to their forward ends, as previously described. In the illustrated construction, circulating air is introduced to the furnace through cold air intake or return duct 42, the open end of which is provided with a suitable grill covering 43. Suitable air filters 45 are located within duct 42, and the cold air passes along duct 42, meanwhile being heated by contact with the heated wall of the combustion chamber. The air thus preliminarily heated then is drawn through filter 45, and into the intake opening of fan 47. Fan 47 is preferably of the positive type, and comprises a cylindrical bladed rotor, indicated at 48. Suitable drive means are provided for fan 47. Fan 47 discharges the air into a generally cone shaped member 52 positioned in the lower portion of secondary heating chamber 18. Suitable humidifying means, such as pan 54 may be provided within secondary heating chamber 18 and supplied with water in any desired way.

The air discharged into chamber 18 by fan 47 passes upwardly around flue members 35 and thus is subjected to a further heating action by contact with the flues which thus serves to further utilize the heat developed and improve efficiency. The partially heated air then passes into heat transferring relation with the tubes and over and through the radiating fins thereon thereby picking up large quantities of heat and raising the temperature of the air to a suitably high value for distribution into the ducts that supply the various rooms of the structure to be heated. Through operation of fan 47 very effective results are secured where a large volume of air is passed through the secondary chamber, where it is heated to a relatively high temperature and distributed into the space to be heated. Thus very satisfactory results have been secured for example utilizing a construction which provided for a flow of air at the rate of 1125 cubic feet per minute through a furnace having outside dimensions of approximately 36" by 52" by 48" and having a cross sectional area of the secondary chamber 18 of 900 sq. in. In such construction with a heat input of 183,000 B. t. u. per hour, the air entering the chamber was at a temperature of 60° F.

and when leaving the furnace had a temperature of 180° F. The stack was not excessively hot to the touch and a measured efficiency of combustion of approximately 85 to 87% was secured.

The heating device of the present invention is found to have not only high efficiency and compact size, but also a wide range of flexibility of output. Thus a single furnace casing structure may be constructed to provide for a small capacity heating plant such as approximately 50,000 to 75,000 B. t. u. per hour, and the same construction may be utilized for a heating device having a capacity up to 400,000 B. t. u. per hour, or even greater. This range of capacities is generally sufficient to cover practically the entire normal range of household heating plants, and the flexibility of the arrangement makes for simplicity and low cost in manufacture as well as contributing greatly to the successful merchandising of the heating plant. Thus the furnace dealer need not keep in stock a number of different furnace constructions for different size plants, but may standardize with a uniform assembly which will function in a highly efficient and satisfactory manner throughout the range of capacities usually encountered. To provide for the greater capacities, and to make the construction so flexible as to be adapted for efficient operation in a predetermined installation having a known B. t. u. requirement, only the heat absorbing and dissipating capacity of the unit need be varied so as to operate efficiently in conjunction with the heat generating means of the proper capacity. This is conveniently effected by utilizing a standard tube for the range of furnace sizes, and varying the number utilized in each case in accordance with the characteristics of that installation. By increasing the number of tubes which are utilized, the heat transmitting capacity of the unit may be varied over the wide range as above described. For such purposes the wall 16 may be provided with knock-out portions indicated in Fig. 3 by reference numeral 50, in the form of disks of suitable size which are adapted to be knocked out of the wall 16 to provide the desired number of openings therethrough for the reception of the tubes. As shown, the fins 27 may be individually attached to the separate tubes 26, the fins being so spaced and related that they do not objectionably interfere with each other in the assembly of the tubes in place, but provide for substantially filling the area of the secondary heat transferring chamber 18. By this means the furnace may be assembled in unit form, the desired number of tubes for the particular installation being assembled separately and individually to build up the heat transferring and radiating section as above described. For instance a single furnace assembly of the dimensions above given has been found to operate in a highly satisfactory manner over the range of capacities stated, and making use of varying numbers of tubes from approximately eleven to thirty-three, these figures being given for illustrative purposes only.

Suitable thermostat controls are preferably provided to control the operation of the heat source and of the air circulating blower. The construction is especially adapted for intermittent operation of the character provided by such control, as the tubes heat rapidly and maintain a high efficiency condition over a series of operations.

In Figs. 4 and 5, there is shown a furnace embodying the present invention and in which a built-in solid fuel feeding mechanism of the automatic stoker type is provided. The furnace so illustrated includes a main casing 60 having a primary heating chamber 61 and a secondary heating chamber 62, separated by transverse wall 63. Wall 63 is pierced by sealed tubes 64 which are provided with fins on the portion lying within the secondary chamber 62, and which are generally similar in construction, location and operation to tubes 26 of Fig. 1. Primary heating chamber 61 contains baffle member 65 similar in construction and operation to baffle member 30 of Fig. 1, and secondary chamber 62 contains flue members 66 which are likewise similar to the corresponding parts of the embodiment shown in Fig. 1. The secondary heating chamber is likewise provided with an intake or air return duct 67, filters 67', and blower means 68, these parts also being similar to the construction shown in Fig. 1. Main casing 60 has at its forward end supplementary casing 68', and at its rearward end a similar supplementary casing 69, these two casings housing the stoker mechanism and associated parts. Forward casing 68' serves as a coal-hopper, and is provided with a suitable filling door 70. Solid fuel from this hopper is gravity fed to a feeding worm 71, located in the passageway 72 at the bottom of the furnace. Worm 71 supplies fuel to burner 74 located within primary heating chamber 61.

Drive means for the stoker, and air supply means are housed within the rearward casing extension 69. The stoker drive mechanism is housed within compartment 74, this drive mechanism including motor 75 and external belt drive 76. The shaft on which the worm 71 is mounted extends rearwardly to compartment 69, and is there suitably connected to the drive means contained within compartment 74. The air supply means within compartment 69 comprises blower 78 which receives air from duct 79 and delivers it forwardly along passage 81 to the burner 74. Duct 79 widens at its upper end, as best shown in Fig. 5, so that it surrounds and is spaced from flue header box 82, and terminates at its upper end in louvres 84 through which air is admitted. This construction serves to direct the air drawn in by blower 78 around the heated header box 82, thus supplying warm air to the point of combustion, and also effecting a further heat economy since heat which otherwise would be lost from the header box is thus recovered.

Humidifying means are provided which comprises a series of evaporating pans 85 placed one above each flue member 66, and of open top construction. These humidifying pans are supplied with water from pipe 87 which carries branches 88 terminating in nozzles which direct water into evaporating pans 85. Pipe 87 leads in through header box 82, and this construction serves to warm the inflowing water and thus facilitate evaporation. It will be observed that the construction of Figs. 4 and 5 results in a compact unitary automatic solid fuel burning furnace, and one which has been found, because of its efficient arrangement and transfer of heat as described, to have an efficiency substantially in excess of solid fuel fired space heating plants known heretofore. Conventional thermostat means may be provided to control the stoker operation and blower operation as desired.

Varying stoker drives may be incorporated in the furnace structure to provide for developing the desired quantity of heat; as an example, stokers which burn from eleven to forty pounds of coal per hour may be utilized with varying capacity of the tubes for absorbing and transmitting such heat to the circulating air, as above described.

In Fig. 6, there is shown a heating plant which is adapted to use electricity as a source of heat. Although the use of electricity as a heat source for a central heating plant has heretofore been prohibitive in cost, the high efficiency of the heating plant constructed in accordance with this invention is such that in locations where especially favorable rates obtain, the use of electricity for this purpose becomes feasible. The furnace illustrated in Fig. 6 includes a casing 90 having a primary heating compartment 91 and a secondary heating compartment 92. Primary heating compartment 91 comprises a highly heat-insulated chamber which receives the forward end of tubes 93, and these tube ends carry electric heating elements 94 which closely surround them for efficient heat transfer. The rearward ends of tubes 93 extend into secondary compartment 92 in a manner generally similar to that described in connection with the other embodiments. Secondary heating compartment 92 is constructed for the circulation of air past the finned ends of tubes 93 in a manner generally similar to that previously described. For this purpose there is provided air intake or return passage 96 leading to fan means 97, the fan serving to circulate the air in the manner previously described. In addition suitable air filters 98 are provided, and a humidifying pan 99 is also located in the path of the circulating air. It is thought that the operation of the device shown in Fig. 5 will be evident from the above description, when taken in connection with the description of the preceding embodiments.

The invention thus provides a furnace construction of extraordinary effectiveness and providing efficient and practicable operation in both industrial and domestic installations. A high proportion of the available heat is recovered and distributed in the most efficient manner for the heating of the air or other medium as desired. In actual operations on a full-sized heating installation, an efficiency of as high as 87% of the heat available was obtained. As a result of this invention a solid fuel burning furnace is operable with very superior efficiency and it becomes feasible to utilize practicably other and more expensive sources of heat on a highly economical basis.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A heating plant of the character described comprising a primary heating chamber, a secondary heating chamber, sealed tubes positioned partly within said primary chamber and partly within said secondary chamber, said sealed tubes having walls of high tensile strength and containing a predetermined quantity of liquid sealed therein, a heat source within said primary heating chamber for supplying heat directly to the portion of said sealed tubes within said primary chamber to heat said tubes rapidly to a high temperature, baffle means within said primary chamber for causing the gases heated by said heat source to pass over said tubes in direct heat transferring relation therewith a plurality of times, a flue for receiving said hot gases after passage over said tubes, said flue extending through said secondary chamber, a circulating air intake for admitting air to said secondary heating chamber, a circulating air outlet for transmitting circulating air from said secondary chamber, said secondary chamber being shaped to provide a path of travel for the circulating air from said air intake into said secondary chamber, over said flue and the portion of the sealed tubes within said secondary chamber, and to said air outlet, and radiating means on said sealed tubes and within said secondary heating chamber for transferring heat from said tubes to said circulating air.

2. A heating plant of the character described comprising a primary heating chamber, a secondary heating chamber adjacent said primary heating chamber and separated therefrom by a wall, individual sealed tubes projecting through said separating wall and positioned partly within said primary chamber and partly within said secondary chamber in the upper portions thereof respectively, said sealed tubes having walls of high tensile strength and containing a predetermined quantity of vaporizable liquid sealed therein, fuel combustion means in the lower portion of said primary heating chamber for supplying heat by convection and direct radiation to the portion of said sealed tubes within said primary chamber, flue means in the lower portion of said secondary chamber for conducting the hot products of combustion out of said primary chamber, said flue means passing through said secondary chamber, baffle means in said primary chamber extending upwardly from the lower wall thereof and to a position adjacent said tubes for directing said products of combustion into contact with said tubes, said baffle means being spaced from said wall to provide a space in said primary chamber for the products of combustion to again pass over said tubes and then into said flue means, a circulating air inlet for admitting air to said secondary chamber, a circulating air outlet for transmitting circulating air from said secondary chamber, said secondary chamber being shaped to provide a path of travel for the circulating air from said air intake upwardly past said flue means and said tubes to said air outlet.

3. A heating furnace of the character described adapted to provide efficient predetermined heating capacity over a wide range with a single size of furnace comprising an enclosing casing, a primary heating chamber, a secondary heating chamber adjacent said primary heating chamber, said chambers being positioned within said casing and separated from each other by a wall, individual sealed tubes projecting through said separating wall and positioned partly within said primary chamber and partly within said secondary chamber, said tubes being individually assembled in said separating wall in predetermined number corresponding to the heating capacity desired, said wall having means providing for selectively receiving a variable number of said tubes, said sealed tubes having walls of high tensile strength and containing a predetermined quantity of vaporizable liquid sealed therein, fuel combustion means in said primary heating chamber for supplying heated products of combustion and hot gases into direct heat transferring contact with the portion of said sealed tubes within said primary heating chamber, flue means for conducting the hot products of combustion out of said primary chamber, said flue means passing through said secondary chamber, baffle means in said primary chamber for directing said products of combustion into contact with said tubes and then into said flue means, a circulating air inlet for admitting air to said secondary chamber, a circulating air outlet for transmitting circulating air from said secondary chamber, said secondary chamber being shaped to provide a path of travel for the circulating air from said air intake past said flue means and said tubes to said air outlet, and radiating means individually attached to each of said tubes in said secondary chamber providing for transferring heat from said tubes to said circulating air.

4. A heating plant of the character described adapted to be constructed as a standard unit and having a variable range of heating capacities comprising a primary heating chamber, a secondary heating chamber adjacent said primary chamber and separated therefrom by a wall, said wall having removable portions formed therein to provide for forming a predetermined number of spaced apertures therein as required for developing the heating capacity desired, sealed tubes projecting individually through said apertures and positioned partly within said primary chamber and partly within said secondary chamber, said tubes containing a predetermined quantity of vaporizable liquid sealed therein and being finned on the portion lying within said secondary chamber, fuel combustion means in said primary chamber for supplying heat by convection and by direct radiation to the portion of the tubes lying within said primary chamber, flue means for conducting the hot products of combustion out of said primary chamber, said flue means passing through said secondary chamber, and blower means for creating a forced draft of air through said secondary chamber over said finned tubes and over said flues to cause the delivery from said secondary chamber of a predetermined quantity of highly heated air.

5. A heating device of the character described comprising a primary heating chamber adjacent one end of the device, a retort in said primary heating chamber for intermittently burning solid fuel, a secondary chamber, a plurality of sealed tubes projecting individually into said primary chamber and into said secondary chamber and having radiating surfaces on the portion thereof within said secondary chamber and having substantial heat storage capacity for storing heat during said intermittent burning of the solid fuel, means for directing hot products of combustion and heated gases into direct heat transferring contact with the portion of said tubes within said primary heating chamber, flue means for conveying the hot products of combustion from said primary heating chamber, said flue means being positioned within said secondary chamber and having a discharge passage adjacent the end of the device remote from the primary heating chamber for receiving the products of combustion from said flue means, blower means also positioned in said secondary chamber for creating a forced draft of air over said flue means and over said radiating surfaces on said tubes, a feed means for feeding solid fuel from a supply thereof to said retort, drive means for said feed means spaced from said primary heating chamber, blower means for supplying combustion air along the lower portion of said device beneath said heating chambers to said retort, and means for directing the flow of air to said last mentioned blower means over said discharge passage to preheat the combustion air delivered to said retort.

DONALD G. JENSEN.